United States Patent [19]

Terada

[11] 4,223,076
[45] Sep. 16, 1980

[54] BATTERY CASING

[75] Inventor: Katumi Terada, Hachioji, Japan

[73] Assignee: Olympus Optical Company Ltd., Tokyo, Japan

[21] Appl. No.: 60,338

[22] Filed: Jul. 25, 1979

[30] Foreign Application Priority Data

Sep. 12, 1978 [JP] Japan .................................. 53/125943

[51] Int. Cl.² .............................................. H01M 2/10
[52] U.S. Cl. ...................................... 429/96; 429/176; 429/178
[58] Field of Search ............................ 429/96-100, 429/178-180, 176

[56] References Cited

U.S. PATENT DOCUMENTS

| 3,078,329 | 2/1963 | Granger | 429/178 X |
| 3,524,393 | 8/1970 | Greger et al. | 95/11 |
| 3,776,778 | 12/1973 | Azuma et al. | 429/178 X |

Primary Examiner—Charles F. Lefevour
Attorney, Agent, or Firm—Weinstein & Sutton

[57] ABSTRACT

A battery casing comprises a lid which closes a battery receiving chamber. Instead of mounting the lid in an outer panel of an instrument in which the battery casing is used, it is directly mounted on the body of the battery casing, thus avoiding the use of the outer panel of the instrument as an electrical conductive path for a battery contained therein. This permits the entire body including the outer panel of the instrument to be formed of a material such as plastics which is inexpensive and easy to machine.

8 Claims, 9 Drawing Figures

BATTERY CASING

BACKGROUND OF THE INVENTION

The invention relates to an improvement of a battery casing having a battery receiving chamber covered by a lid which forms part of an external wall of an instrument for which the battery provides a power supply.

A battery casing of the kind described is used in a number of high precision instruments such as photographic camera, exposure meter, quartz operated watch or the like which utilizes a small size battery, in particular, mercury or silver battery, as a power supply.

Referring to FIG. 1, there is shown a conventional battery casing which is adapted to contain battery 1 in its battery receiving chamber 2, which is formed by nonconductive casing frame 3 which is in turn disposed inside a photographic camera. Electrical terminal member 4 is disposed on the bottom of chamber 2 so as to be maintained in contact with the cathode of battery 1 when the latter is disposed therein, and extends out of the battery casing. Lid 5 formed of a metal material such as brass is adapted to close the battery receiving chamber, and when it is closed in place, it contacts the anode of battery 1 to serve as the other conductive terminal member which represents the ground connection terminal. Lid 5 is formed with threads 5a which engage female threads 6 formed in inward projection 6 from an outer panel of a photographic camera. To limit the extent of movement of lid 5 beyond projection 6, the latter is formed with step 6b, which is engaged by a flange portion of lid 5. In this manner, the anode of battery 1 is electrically connected with panel 6 through lid 5. Washer 9 with a tongue is mounted inside panel 6 by means of set screw 8, and lead wire 10 is soldered to the tongue for an electrical interconnection. It is to be noted that terminal member 4 is also soldered with lead wire 7 for connection with an electrical circuit. In this manner, the panel 6 of the camera serves as an electrical conductive path. It will be appreciated that since lid 5 is detachably mounted on panel 6, it is necessary that panel 6 and lid 5 be both formed of a metal material such as brass and machined by drawing, deburring and tapping. This resulted in an increased cost of the battery casing and hence the overall assembly in which it is used.

It is then desirable to eliminate such disadvantages by forming lid 5 and the body of the casing including panel 6 of an inexpensive material such as plastics which may be easily machined. However, in the prior art arrangement, lid 5 is used as a terminal associated with one electrode of the battery and panel 6 used as a conductive path, so that these parts could not have been formed of a plastic material.

SUMMARY OF THE INVENTION

It is an object of the invention to eliminate the above disadvantages of the prior art by providing a battery casing which is easy and inexpensive to manufacture.

In the battery casing of the invention, the lid is not directly mounted on the outer panel of an instrument with which it is associated as in the conventional arrangement, but is instead mounted on the body of the battery casing itself. This eliminates the need for a machining operation such as drawing, deburring and tapping on the part of an outer panel of the instrument which is formed of a metal material such as brass, thereby permitting a reduction in the cost of manufacturing a battery casing. Since the lid is not mounted on the outer panel of the instrument, which is hence no longer used to form an electrical conductive path, it is possible to form the entire body inclusive of the outer panel of the instrument with a material such as plastics which is inexpensive and easy to machine, allowing a reduction in the weight of the overall instrument.

With the battery casing of the invention, the use of a conductive material is minimized with a simplified construction, so that the reliability is improved. The battery may be mounted on the body in the absence of the instrument, and hence simplifies an automatic test during the assembly. A further reduction in the cost of manufacturing the battery casing may be achieved by forming the lid thereof from a material such as plastics.

DESCRIPTION OF PREFERRED EMBODIMENTS

Figure 1:
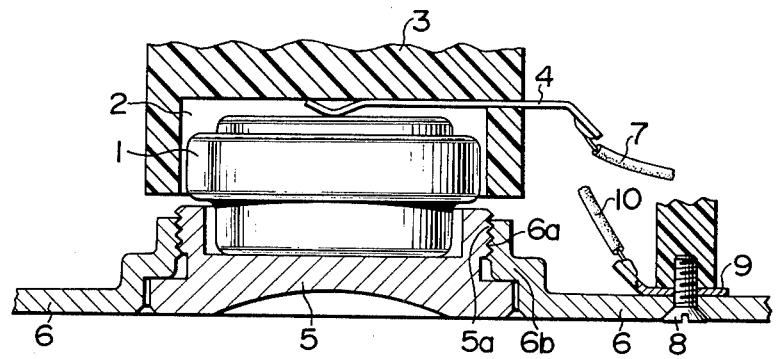
FIG. 1 is a schematic cross section of a conventional battery casing.
Figure 2:
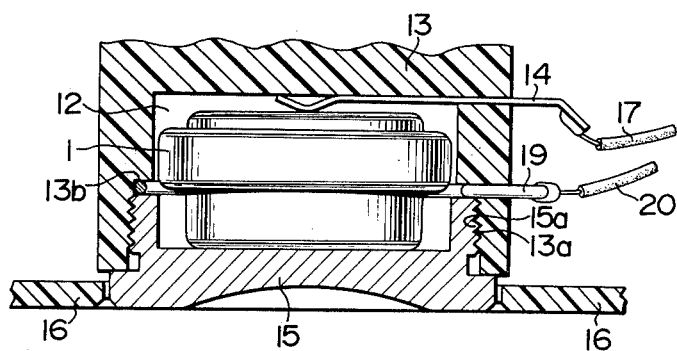
FIG. 2 is a cross section of a battery casing according to one embodiment of the invention.
Figure 3:
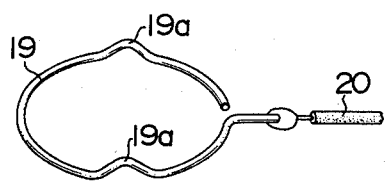
FIG. 3 is a perspective view showing an example of a terminal member which may be used in the battery casing shown in FIG. 2.

Referring to FIG. 2, there is shown a battery casing according to one embodiment of the invention, as applied to a photographic camera. As shown, the battery casing includes chamber 12 for receiving battery 1, which chamber is formed in non-conductive frame 13 formed of a material such as plastics and which is disposed inside a photographic camera. The battery casing further comprises terminal member 14 which is disposed on the bottom of chamber 12 for contact with the cathode of battery 1 and extending out of the casing, lid 15 formed of a metal such as brass which is disposed for contact with the anode of battery 1 to serve as a terminal therefor, and another terminal member 19 which is disposed in contact with lid 15 and extending out of the casing. Female threads 13a are formed along the inner surface of frame 13 toward the opening of battery receiving chamber 12, and are adapted to receive male threads 15a formed on the outer surface of lid 15, thereby allowing lid 15 to be mounted on frame 13 to close battery receiving chamber 12. As shown in FIG. 3, terminal member 19 comprises a ring-shaped resilient wire formed with a plurality of projecting folds 19a, which are two in number in the example shown, serving as electrical contacts. It is mounted in abutment against step 13b formed in the inner wall of frame 13 which defines battery receiving chamber 12. The ring portion of terminal member 19 is fitted around battery 1 contained in the chamber, with folds 19a contacting the inner end face of lid 15 which is disposed in electrical contact with the anode of battery 1, whereby an electrical connection with the anode is established. Portions of terminal members 19 and 14 which extend out of the casing are connected with lead wires 17, 20, respectively, as by soldering, for connection with an electrical circuit. Lower panel 16 is formed of a non-conductive material such as plastics, and is a separate member which has no electrical connection with lid 15.

Figure 4:
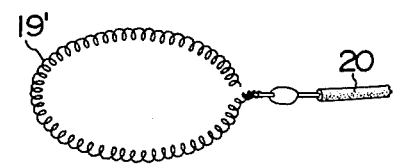
FIG. 4 is a perspective view of another example of terminal member.

As shown in FIG. 4, terminal member 19 may be formed as toroidal coil 19' which is formed of a resilient wire, thus increasing the area of contact with the inner end face of lid 15.

With the described battery casing, when battery 1 is mounted in frame 13 and lid 15 mounted in place, the cathode of battery 1 contacts terminal member 14 while the anode thereof contacts lid 15 which is in turn maintained in electrical contact with terminal member 19 (or 19'), thus completing a conductive path across battery 1 which includes terminal member 14, lead wire 17, lid 15, terminal member 19 (or 19') and lead wire 20. It is to be noted that a sufficient pressure of contact is maintained between lid 15 and terminal member 19 by the resilience produced by projecting folds 19a or coil 19', thus providing a reliable electrical connection.

Figure 5:
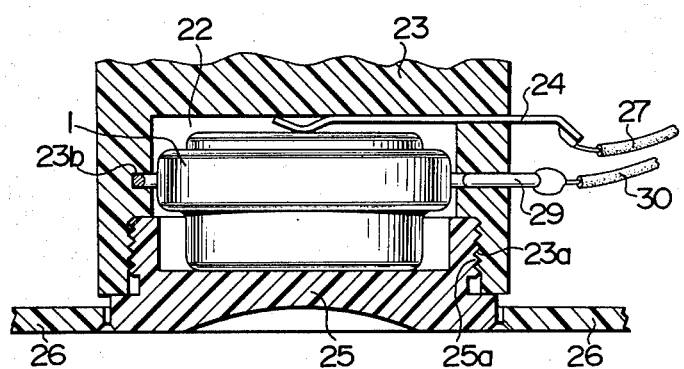
FIG. 5 is a cross section of a battery casing according to another embodiment of the invention.
Figure 6:
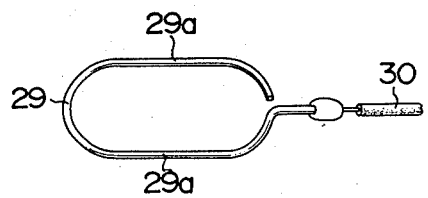
FIG. 6 is a perspective view of an example of terminal member which may be used in the battery casing shown in FIG. 5.

FIG. 5 shows another embodiment of the invention. In this instance, battery receiving chamber 22 which receives battery 1 is formed in non-conductive frame 23 which is arranged inside a photographic camera. Terminal member 24 is disposed on the bottom of chamber 22 for contact with the cathode of battery 1 and extends out of the casing. Lid 25 is formed of a non-conductive material such as plastics, and another terminal member 29 is disposed around the periphery of battery 1 and extends out of the battery casing. Female threads 23a are formed in the inner wall of frame 23 toward the opening of chamber 22, and are engaged by male threads 25a formed on lid 25, thus allowing the lid to be mounted on frame 23. As shown in FIG. 6, terminal member 29 is in the form of an oblong ring of resilient wire, with the longer sides extending parallel to each other. These parallel portions 29a are adapted to bear against the peripheral surface of battery 1. Terminal member 29 is disposed in peripheral groove 23b which is formed in frame 23 at an intermediate position along the length thereof. Terminal members 24, 29 are connected with lead wires 27, 30, respectively, by soldering for connection with an electrical circuit. Lower panel 26 is formed of a non-conductive material such as plastics, for example, and represents a separate member which has no electrical connection with the battery casing.

Figure 7:
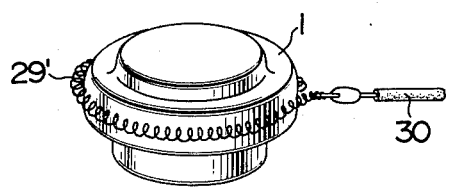
FIG. 7 is a perspective view of another example of terminal member.

As before and as shown in FIG. 7, terminal member 29 may comprise toroidal coil 29' of resilient wire, with the toroid engaging the peripheral surface of battery 1. In the present embodiment, lid 25 is formed of a non-conductive material, but it may be formed of a conductive material such as metal inasmuch as both lid 25 and panel 26 of this embodiment need not be formed of a non-conductive material.

Figure 8:
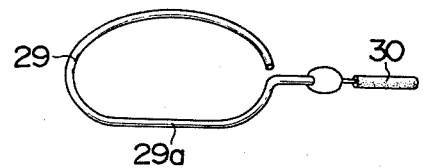
FIG. 8 is a perspective view of a further example of terminal member.

FIg. 8 shows a modification of terminal member 29, which has its only one longer side formed to extend rectilineally to provide region 29a for contact with the peripheral surface of battery 1.

With this embodiment, when battery 1 is loaded into frame 23 and lid 25 mounted thereon, the cathode of battery 1 electrically contacts terminal member 24 while the anode of battery 1 electrically contacts terminal member 29 (or 29'), whereby a conductive path across battery 1 is completed including terminal member 24, lead wire 27 and terminal member 29 and lead wire 30.

Figure 9:
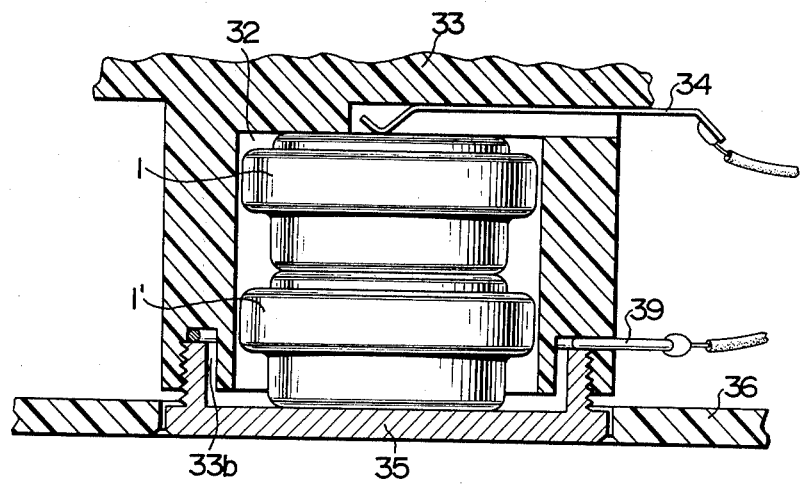
FIG. 9 is a cross section of a battery casing according to a further embodiment of the invention.

In the embodiments described above, the battery casing is adapted to contain a single battery, but a similar battery casing may be provided which allows a tandem connection of a pair of or more batteries in series. Such an arrangement is shown in FIG. 9 where terminal member 39 is disposed in a recess formed in the frame of battery casing, in contradistinction to terminal members 19, 29 shown in the previous embodiments which are directly disposed on the inner surface of battery receiving chambers 12, 22. Specifically, the battery casing of FIG. 9 includes non-conductive frame 33 defining battery receiving chamber 32 which is adapted to receive a pair of batteries 1, 1' disposed in tandem relationship with each other. Terminal member 34 is disposed on the bottom of chamber 32 for contact with the cathode of battery 1, and extends out of the casing. Lid 35 formed of an electrically conductive material serves as the other terminal member which electrically contacts the anode of battery 1'. In the lower end face, frame 33 is formed with recess 33b which is threaded to threadably engage lid 35. The other terminal member 39 is disposed in recess 33b so that it may electrically contact lid 35 as the latter is threadably mounted, and has its one end extending out of the battery casing. In this manner, the tandem connection of batteries 1, 1' feeds an operating voltage across terminal member 34 which is connected with the cathode of battery 1 and the other terminal member 39 which is connected with the anode of battery 1' through lid 35.

What is claimed is:

1. A battery casing comprising a non-conductive frame which defines a battery receiving chamber said chamber having an inner sidewall, a terminal member disposed on the bottom of the battery receiving chamber for contact with one electrode of a battery contained therein, another terminal member formed of a resilient material and mounted on the inner sidewall of the battery receiving chamber in surrounding relationship with the periphery of the battery contained therein and electrically connected with the other electrode of the battery, and a lid which is detachably mounted on the frame.

2. A battery casing according to claim 1 in which the lid is formed of an electrically conductive material so that it electrically contacts said another terminal member when it is mounted on the frame, thus providing an electrical interconnection between said another terminal and the other electrode of the battery.

3. A battery casing according to claim 2 in which said another terminal member is in the form of a ring of resilient wire having projecting folds formed therein which are adapted to resiliently engage the inner end face of the lid.

4. A battery casing according to claim 2 in which said another terminal is in the form of a toroidal coil of resilient wire which is adapted to engage the inner end face of the lid.

5. A battery casing according to claim 1 in which the lid is formed of an electrically non-conductive material and wherein said another terminal member is disposed for resilient abutment against the peripheral surface of the battery contained in the battery receiving chamber.

6. A battery casing according to claim 5 in which said another terminal is in the form of a ring of resilient wire having a rectilinear portion which is adapted to resiliently bear against the peripheral surface of the battery contained in the battery receiving chamber.

7. A battery casing according to claim 5 in which said another terminal member comprises a toroidal coil which resiliently bears against the peripheral surface of the battery contained in the battery receiving chamber.

8. A battery casing comprising a non-conductive frame and a lid detachably connected directly to said frame to form a battery receiving chamber said chamber having an inner sidewall, a first terminal member disposed on the bottom of the battery receiving chamber for contact with one electrode of a battery contained therein, a second terminal member formed of a resilient material and mounted on said inner sidewall inside the battery receiving chamber in surrounding relationship with the periphery of the battery contained therein and electrically connected with the other electrode of the battery.

* * * * *